United States Patent
Yi

(10) Patent No.: US 10,298,359 B2
(45) Date of Patent: May 21, 2019

(54) METHOD AND APPARATUS FOR PERFORMING UPLINK TRANSMISSION FOR USER EQUIPMENT REQUIRING COVERAGE ENHANCEMENTS IN WIRELESS COMMUNICATION SYSTEM

(71) Applicant: LG Electronics Inc., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 15/540,154

(22) PCT Filed: Dec. 28, 2015

(86) PCT No.: PCT/KR2015/014367
§ 371 (c)(1),
(2) Date: Jun. 27, 2017

(87) PCT Pub. No.: WO2016/108556
PCT Pub. Date: Jul. 7, 2016

(65) Prior Publication Data
US 2017/0373794 A1    Dec. 28, 2017

Related U.S. Application Data

(60) Provisional application No. 62/097,082, filed on Dec. 28, 2014.

(51) Int. Cl.
*H04L 1/00* (2006.01)
*H04W 4/00* (2018.01)
(Continued)

(52) U.S. Cl.
CPC .......... *H04L 1/0042* (2013.01); *H04L 1/0061* (2013.01); *H04L 1/0073* (2013.01); *H04W 4/70* (2018.02); *H04L 5/0053* (2013.01)

(58) Field of Classification Search
CPC ... H04L 1/0042; H04L 1/0061; H04L 1/0073; H04L 5/0053; H04W 4/70
See application file for complete search history.

(56) References Cited

U.S. PATENT DOCUMENTS

2013/0135984 A1*   5/2013   Choi ................... H04W 72/04
                                                            370/209
2013/0145239 A1    6/2013   Pi et al.
(Continued)

OTHER PUBLICATIONS

CATT, "PUSCH coverage enhancement for Rel-13 low complexity UEs and other UEs", R1-144619, 3GPP TSG RAN WG1 Meeting #79, San Francisco, USA, Nov. 8, 2014, pp. 1, 2.
(Continued)

*Primary Examiner* — Kyle Vallecillo
(74) *Attorney, Agent, or Firm* — Dentons US LLP

(57) ABSTRACT

A method and apparatus for transmitting uplink (UL) data in a wireless communication system is provided. For one embodiment, a user equipment (UE), adds short cyclic redundancy check (CRC) per each fragment, which consists of a transport block for the UL data, and transmits the UL data to a network. For another embodiment, the UE selects one physical uplink control channel (PUCCH) format, which is used to carry uplink control information (UCI), among multiple PUCCH formats, and transmits the UL data to a network by using the one PUCCH format.

10 Claims, 11 Drawing Sheets

(51) Int. Cl.
*H04W 4/70* (2018.01)
*H04L 5/00* (2006.01)

(56) References Cited

U.S. PATENT DOCUMENTS

| | | |
|---|---|---|
| 2013/0322398 A1 | 12/2013 | Jang et al. |
| 2014/0219386 A1 | 8/2014 | Kim et al. |
| 2015/0016312 A1* | 1/2015 | Li ..................... H04W 74/0833 370/280 |
| 2015/0131579 A1* | 5/2015 | Li ............................. H04L 1/08 370/329 |
| 2015/0365914 A1* | 12/2015 | Yu ......................... H04W 68/02 455/458 |
| 2016/0128033 A1* | 5/2016 | Larsson ................ H04W 28/20 370/329 |
| 2016/0192376 A1* | 6/2016 | Lee ....................... H04W 48/20 370/252 |
| 2016/0278128 A1* | 9/2016 | Krishnamurthy ........................... H04W 74/0833 |
| 2017/0230780 A1* | 8/2017 | Chincholi ............... H04W 4/70 |

OTHER PUBLICATIONS

ZTE, "Discussion on physical data channels for MTC enhancement", R1-144818, 3GPP TSG RAN WG1 Meeting #79, San Francisco, USA, Nov. 8, 2014, pp. 1-3.

* cited by examiner

METHOD AND APPARATUS FOR PERFORMING UPLINK TRANSMISSION FOR USER EQUIPMENT REQUIRING COVERAGE ENHANCEMENTS IN WIRELESS COMMUNICATION SYSTEM

CROSS-REFERENCE TO RELATED APPLICATIONS

This application is the National Stage filing under 35 U.S.C. 371 of International Application No. PCT/KR2015/014367, filed on Dec. 28, 2015, which claims the benefit of U.S. Provisional Application No. 62/097,082 filed on Dec. 28, 2014, the contents of which are all hereby incorporated by reference herein in their entirety.

BACKGROUND OF THE INVENTION

Field of the Invention

The present invention relates to wireless communications, and more particularly, to a method and apparatus for performing uplink (UL) transmission for a low complexity user equipment (UE) requiring coverage enhancements in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

A size of uplink (UL) data for the MTC UE is expected to be relatively small. By this characteristic, efficient transmission method for the MTC UE may be required.

SUMMARY OF THE INVENTION

The present invention provides a method and apparatus for performing uplink (UL) transmission for a low complexity user equipment (UE) requiring coverage enhancements in a wireless communication system. The present invention provides a method and apparatus for transmitting UL data by utilizing multiple short cyclic redundancy checks (CRCs) within a long transport block size (TBS). The present invention provides a method and apparatus for transmitting UL data by utilizing a physical uplink control channel (PUCCH) format. The present invention provides a method and apparatus for using a format of a demodulation references signal (DM-RS) and data multiplexing when a small number of subcarriers (i.e. 12 subcarriers), compared to 3rd generation partnership project (3GPP) long-term evolution (LTE), are used.

In an aspect, a method for transmitting, by a user equipment (UE), uplink (UL) data in a wireless communication system is provided. The method includes adding short cyclic redundancy check (CRC) per each fragment, which consists of a transport block for the UL data, and transmitting the UL data to a network.

In another aspect, a method for transmitting, by a user equipment (UE), uplink (UL) data in a wireless communication system is provided. The method includes selecting one physical uplink control channel (PUCCH) format, which is used to carry uplink control information (UCI), among multiple PUCCH formats, and transmitting the UL data to a network by using the one PUCCH format.

UL data for a UE requiring coverage enhancements can be transmitted effectively.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
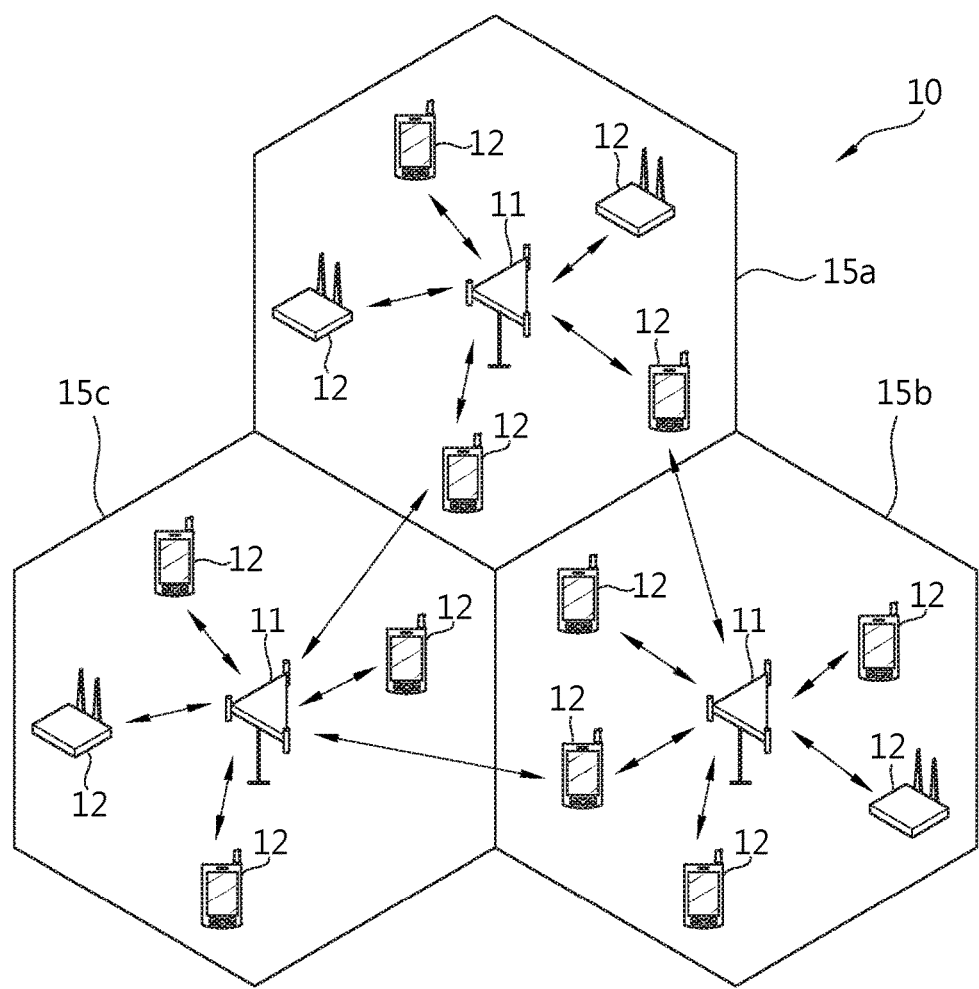
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
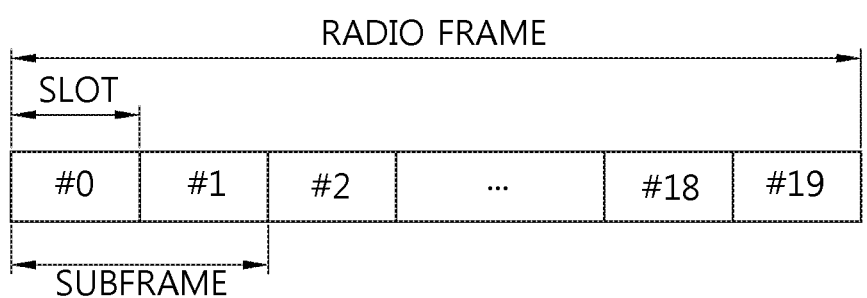
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
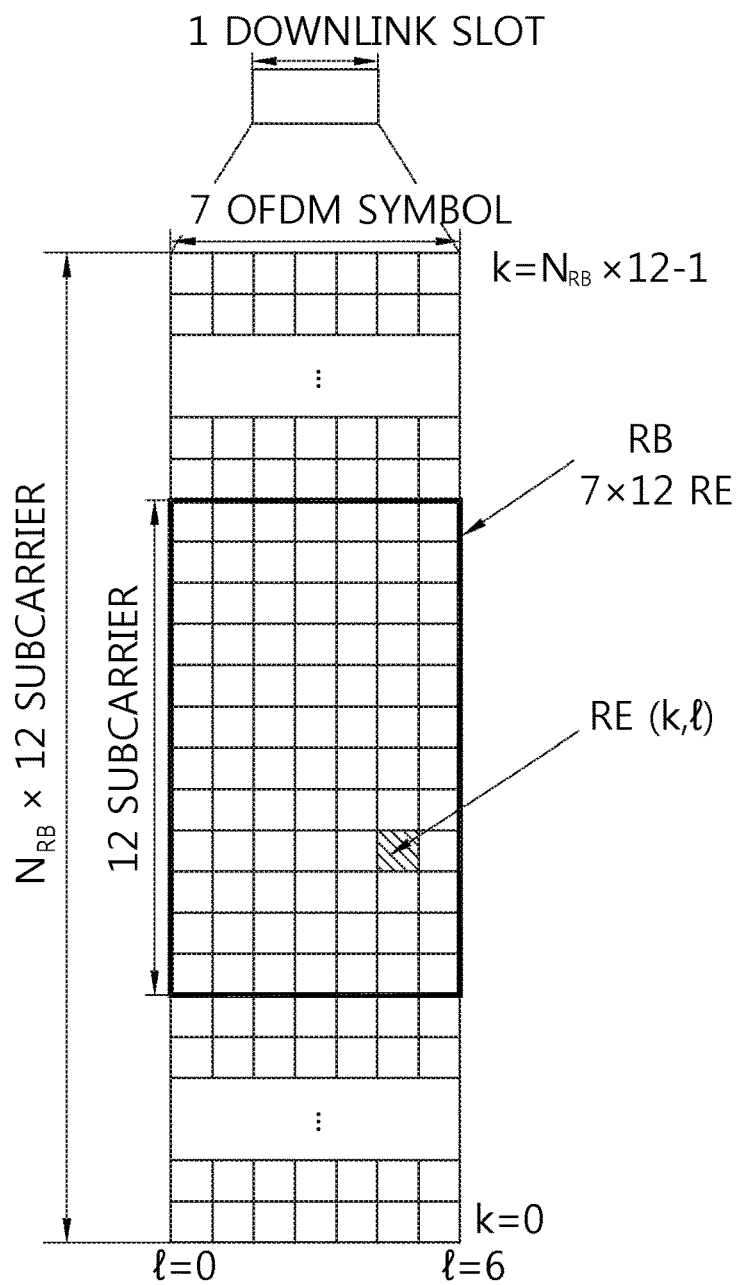
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
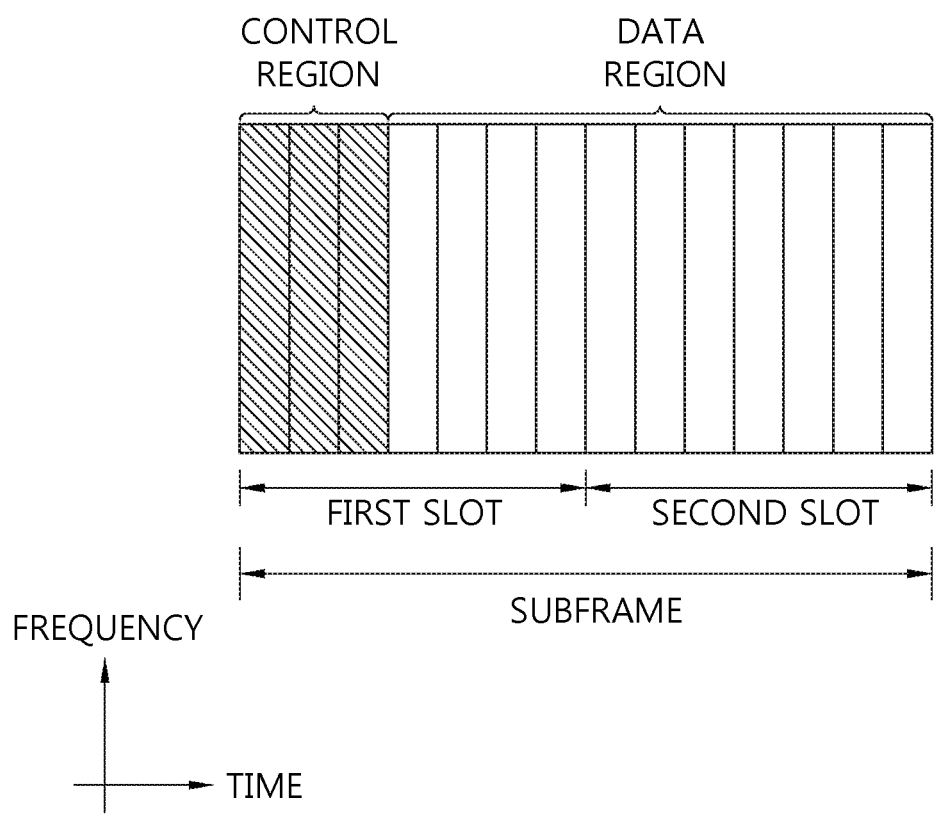
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
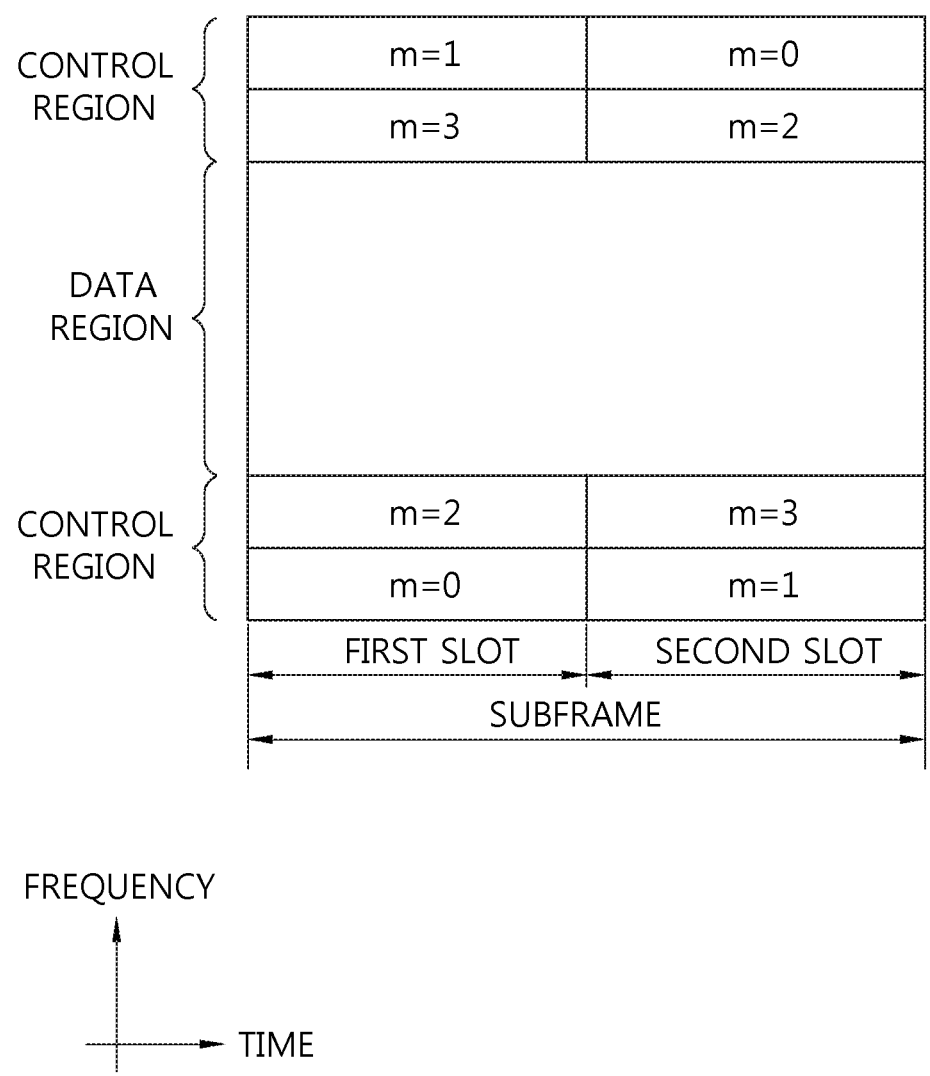
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Figure 6:
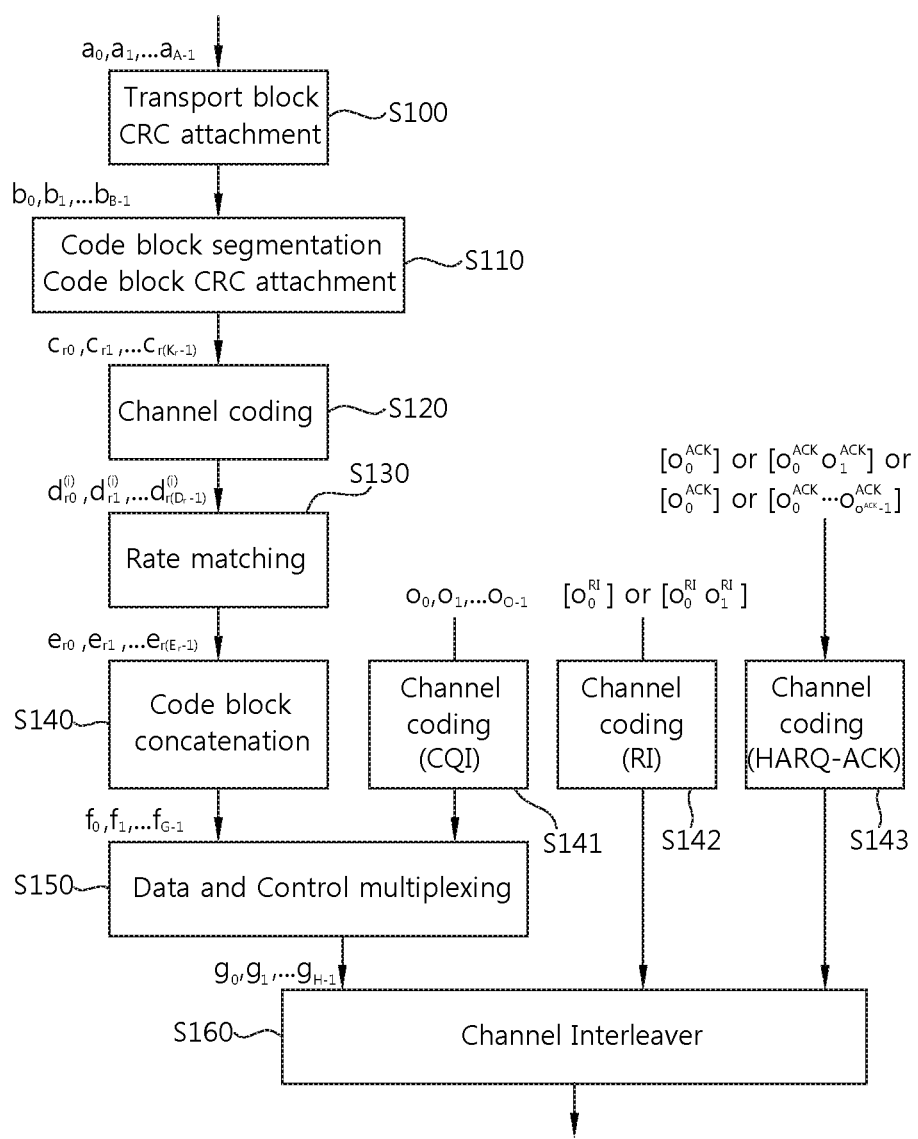
FIG. 6 shows transport block processing for UL-SCH.

FIG. 6 shows transport block processing for UL-SCH. That is, FIG. 6 shows PUSCH transmission procedure. FIG. 6 shows the processing structure for the UL-SCH transport channel on one UL cell. Data arrives to the coding unit in the form of a maximum of two transport blocks every TTI per UL cell.

In step S100, CRC is added to the transport block. Error detection is provided on each UL-SCH transport block through a CRC. The entire transport block is used to calculate the CRC parity bits. Denote the bits in a transport block delivered to layer 1by $a_0, a_1, a_2, a_3, \ldots a_{A-1}$, and the parity bits by $p_0, p_1, p_2, p_3, \ldots p_{L-1}$. A is the size of the transport block and L is the number of parity bits. The lowest order information bit $a_0$ is mapped to the most significant bit of the transport block.

In step S110, code block segmentation and code block CRC attachment are performed. The bits input to the code block segmentation are denoted by $b_0, b_1, b_2, b_3, \ldots b_{B-1}$ where B is the number of bits in the transport block (including CRC). The bits after code block segmentation are denoted by $c_{r0}, c_{r1}, c_{r2}, c_{r3}, \ldots c_{r(Kr-1)}$, where r is the code block number and $K_r$ is the number of bits for code block number r.

In step S120, channel coding of data and control information is performed. Code blocks are delivered to the channel coding block. The bits in a code block are denoted by $c_{r0}, c_{r1}, c_{r2}, c_{r3}, \ldots c_{r(Kr-1)}$, where r is the code block number, and $K_r$ is the number of bits in code block number r. The total number of code blocks is denoted by C and each code block is individually turbo encoded. After encoding the bits are denoted by $d_{r0}^{(i)}, d_{r1}^{(i)}, d_{r2}^{(i)}, d_{r3}^{(i)}, \ldots d_{r(Dr-1)}^{(i)}$, with i=0, 1, and 2 and where $D_r$ is the number of bits on the i-th coded stream for code block number r, i.e. $D_r=K_r+4$.

In step S130, rate matching is performed. Turbo coded blocks are delivered to the rate matching block. They are denoted by $d_{r0}^{(i)}, d_{r1}^{(i)}, d_{r2}^{(i)}, d_{r3}^{(i)}, \ldots d_{r(Dr-1)}^{(i)}$, with i=0, 1, and 2, where r is the code block number, i is the coded stream index, and $D_r$ is the number of bits in each coded stream of code block number r. The total number of code blocks is denoted by C and each coded block is individually rate matched. After rate matching, the bits are denoted by $e_{r0}, e_{r1}, e_{r2}, e_{r3}, \ldots e_{r(Er-1)}$, where r is the coded block number, and where $E_r$ is the number of rate matched bits for code block number r.

In step S140, code block concatenation is performed. The bits input to the code block concatenation block are denoted by $e_{r0}, e_{r1}, e_{r2}, e_{r3}, \ldots e_{r(Er-1)}$, for r=0, …, C-1 and where $E_r$ is the number of rate matched bits for the r-th code block. The bits after code block concatenation are denoted by $f_0, f_1, f_2, f_3, \ldots f_{G-1}$, where G is the total number of coded bits for transmission of the given transport block over $N_L$ transmission layers excluding the bits used for control transmission, when control information is multiplexed with the UL-SCH transmission.

In steps S141, S142 and S143, control data arrives at the coding unit in the form of channel quality information (CQI and/or PMI), HARQ-ACK and rank indication. Different coding rates for the control information are achieved by allocating different number of coded symbols for its transmission. When control data are transmitted in the PUSCH, the channel coding for HARQ-ACK, rank indication and channel quality information $f_0, o_1, o_2, \ldots o_{O-1}$ is done independently.

In step S150, multiplexing of data and control information is performed. The control and data multiplexing is performed such that HARQ-ACK information is present on both slots and is mapped to resources around the demodulation reference signals. In addition, the multiplexing ensures that control and data information are mapped to different modulation symbols.

In step S160, channel interleaver in conjunction with the resource element mapping for PUSCH implements a time-first mapping of modulation symbols onto the transmit waveform while ensuring that the HARQ-ACK and RI information are present on both slots in the subframe. HARQ-ACK information is mapped to resources around the uplink demodulation reference signals while RI information is mapped to resources around those used by HARQ-ACK.

Figure 7:
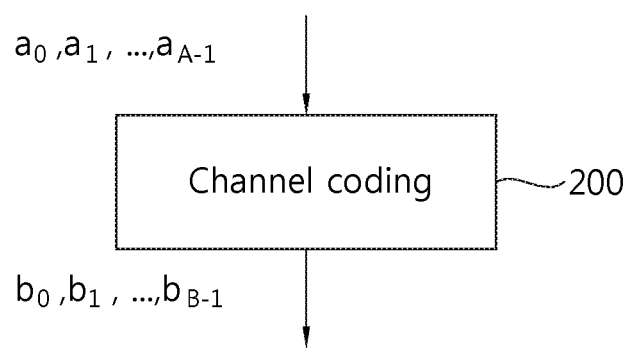
FIG. 7 shows processing for uplink control information.

FIG. 7 shows processing for uplink control information. That is, FIG. 7 shows PUCCH transmission procedure. In step S200, data arrives to the coding unit in the form of indicators for measurement indication, scheduling request and HARQ-ACK. Three forms of channel coding are used, one for HARQ-ACK and for combination of HARQ-ACK and periodic channel state information (CSI) transmitted on PUCCH format 3, including the cases with SR, another for the channel quality information CQI/PMI transmitted on PUCCH format 2, and another for combination of CQI/PMI and HARQ-ACK transmitted on PUCCH format 2/2a/2b.

There are multiple types of machine type communication (MTC) devices including smart metering, health care devices, etc. Often, these devices may be installed in environments where coverage may not be so good, as hand-held devices may not be used in such environments. One example may be water metering devices which may be installed in the basement or garage where coverage in general is limited. In general, UL transmission has more coverage issue than DL transmission due to lower transmission power, less efficient uplink spectral efficiency, and so on. Furthermore, to reduce power consumption, reducing UL transmission power may also be considered. Thus, coverage of UL may be more bottleneck than DL coverage, and thus, coverage enhancement of UL transmission may be essential. Generally, the packet size of MTC, particularly, devices in deep coverage hole, is expected to be small. Thus, some considerations for UL transmissions may be considered.

Hereinafter, various methods for performing UL transmission for a UE requiring coverage enhancements may be proposed according to embodiments of the present invention. Hereinafter, a UE requiring coverage enhancements may be referred to as one of a MTC UE, a low cost UE, a low end UE, a low complexity UE, a narrow(er) band UE, a small(er) band UE, or a new category UE. Or, just a UE may refer one of UEs described above. In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

(1) Short CRC or variable CRC length may be utilized according to an embodiment of the present invention. For example, if transport block size (TBS) of the UL data is 16 (by modulation and coding scheme (MCS)=0) with 1 RB allocation, adding 24 bits of CRC seems a big burden. For example, up to 32 bits of UL data, 8 bits of CRC seems sufficient. If the length of the UL data becomes larger, short CRC may lead frequent false alarm. To minimize the hardware complexity and reduce performance loss with short CRC, one of the following approaches may be considered.

Utilize multiple short CRCs within a long TBS: if long TBS is used (e.g. 144 bits), multiple of short CRCs may be added per smaller fragment. For example, if the size of the segment is 72 bits, 144 bits of TBS may have two CRCs.

Figure 8:
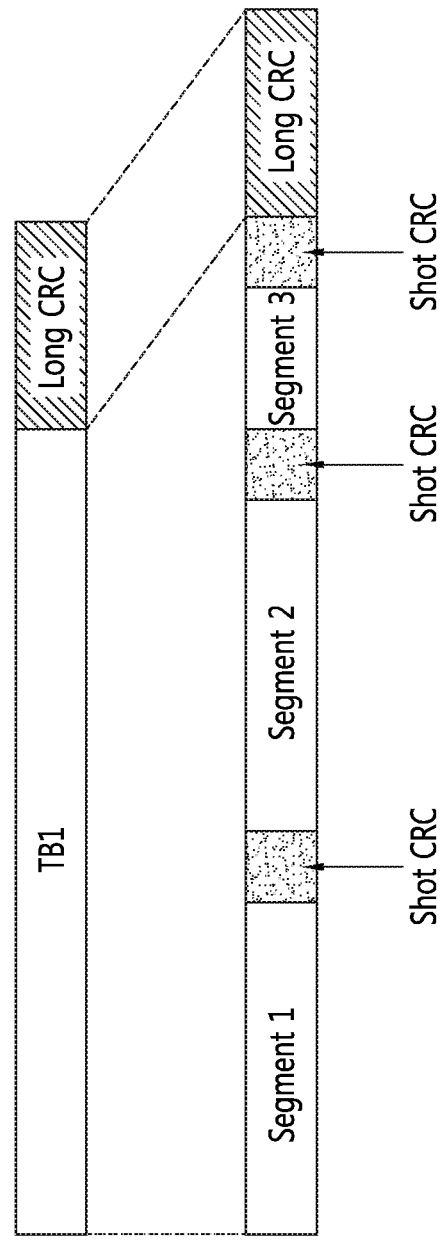
FIG. 8 shows an example of multiple short CRCs within a long TBS according to an embodiment of the present invention.

FIG. 8 shows an example of multiple short CRCs within a long TBS according to an embodiment of the present invention. Referring to FIG. 8, it is assumed that TBS is 144 bits. 144 bits of TBS is divided into two segments, i.e. segment 1 and segment 2, and the size of each segment is 72 bits. According to an embodiment of the present invention, short CRC may be added after each segment. The size of short CRC may be 8 bits. The remaining bits (e.g. 16 bits) may consist of segment 3, and additional CRC may be added after segment 3.

Figure 9:
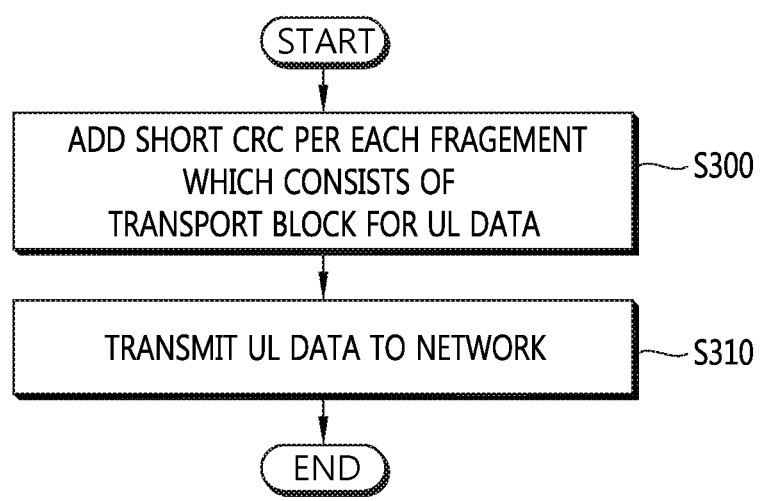
FIG. 9 shows a method for transmitting, by a UE, UL data according to an embodiment of the present invention.

FIG. 9 shows a method for transmitting, by a UE, UL data according to an embodiment of the present invention. The UE may be one of a UE requiring coverage enhancements, a MTC UE, a low cost UE, a low end UE, a low complexity UE, a narrow band UE, a small band UE, or a new category UE.

In step S300, the UE adds short CRC per each fragment, which consists of a transport block for the UL data. The UE may divide the transport block into a plurality of fragments. A size of the short CRC may be shorter than 24 bits, e.g. 8 bits. A size of the transport block may be larger than a specific size.

In step S310, the UE transmits the UL data to a network.
Variable CRC length: The length of CRC may be determined based on TBS and/or $I_{TBS}$. If large TBS is used (e.g. 144 bits), original CRC length (24 bits) may be used, and if short TBS is used (e.g. 36 bits), short CRC may be used (8 bits).

Dynamic indication of CRC length in DCI: In addition to TBS indication by DCI (either explicitly or implicitly), the length of CRC used for UL transmission may be signaled via DCI as well.

(2) PUCCH format may be utilized according to an embodiment of the present invention. An approach to reduce CRC overhead may be to remove CRC from UL data transmission, and to rely on higher-layer reliability mechanism such as radio link control (RLC) layer retransmission/reassembly. If this approach is used, UL ACK-NACK via PHICH may not be needed for MTC operation at least for coverage enhancements. Hereinafter, PUCCH format may refer a channel which can carry uplink control information (UCI), such as ACK/NACK or CSI. As shown above in FIG. 6 and FIG. 7, the PUCCH format/transmission may not use any CRC generally as ACK/NACK is not expected, while the PUSCH transmission may use CRC. Furthermore, resources of PUCCH format/transmission may rather be predefined or semi-statically configured, while resources of PUSCH transmission may be dynamically configured by DCI. In case a new format is introduced to carry ACK/NACK or CSI, particularly to handle different number of subcarriers used in UL transmission, the new format may be used where PUCCH format is used in the below description without loss of generality.

One example of this approach is to utilize PUCCH format to transmit UL data. For example, PUCCH format 3 or PUCCH format 2 may be utilized to carry small packet size. Since TBS may be larger than a size of data being able to be carried in one PUCCH transmission at one time, necessary segmentation into a few small TBS may be necessary. Even though PUCCH format may be used to transmit UL data, TBS and resource allocation may be still done via UL grant. It may be assumed that PUCCH format used for UL data transmission may be predetermined or configured semi-statically. It may be also considered to dynamically select PUCCH format which may determine the number of subframes needed to transmit one TB. In terms of transmitting one TB, the following options may be considered.

One TB ($a_1, \ldots, a_m$) may be encoded via turbo coding ($b_0, \ldots, b_n$) using MCS signaled by UL grant (or configured semi-statically or pre-fixed), and each PUCCH in one subframe (j-th subframe among m subframes transmitting the TB) may transmit [$b_i, \ldots, b_{i+k}$] where k is the bit size carried in one PUCCH, and $i=k*j$. This approach may require more subframes to transmit one TB depending on coding rate, yet, it may offer more reliable transmission. For encoding, one TB+CRC may be used instead of just turbo coding. After encoding, only m-bits of encoded data may be transmitted, or only bits which may be carried via 1 RB using PUSCH with assigned MCS (e.g. 144 RE*2=288 bits) may be transmitted using PUCCH.

One TB ($a_1, \ldots, a_m$) may be segmented into a few small segments and each PUCCH in one subframe may transmit each segment. For example, each PUCCH in one subframe (j-th subframe among m subframes transmitting the TB) transmits [$a_i, \ldots, a_{i+k}$] where k is the bit size carried in one PUCCH, and $i=k*j$.

When PUCCH format is utilized to carry UL data, retransmission may be handled by one of the following approaches.

No retransmission at physical layer (rely on higher layer retransmission mechanism)

Retransmission with same redundancy version (RV) (no HARQ combining if this is used): For example, if information is sent directly via RM (Reed-Muller) code, combining between initial transmission and retransmission becomes challenging. In this case, HARQ buffer combining is not assumed. If retransmission is used, for example, chase combining may be used.

Retransmission with different redundancy version based on the recent UL grant: Similar to current PUSCH, RV may change based on the UL grant.

Even for initial transmission, in a repetition bundle, different RVs may be used even if PUCCH format is used for transmitting UL data. For example, if one TB is transmitted over m subframes and there are n times of repetition (i.e. m*n subframes are used for repetition of one TB), different RV may be used within n times of repetition. For example, different RVs may be used as a manner of RV=0, 1, 2, 3, 0, 1, 2, 3 . . . i.e. circular fashion. Or, different RVs may be used as a manner of RV=0, 0, 0 . . . , 0, 1, 1, 1 . . . , 1, 2, 2, 2 . . . , 2, 3, 3, 3 . . . , 3, i.e. repeated per multiple subframes. In this case, the starting RV may be RV indicated by the most recent UL grant. For example, if RV=1 is indicated, RV=1, 2, 3, 0, 1, 2, 3, 0 . . . may be used for circular fashion approach.

Figure 10:
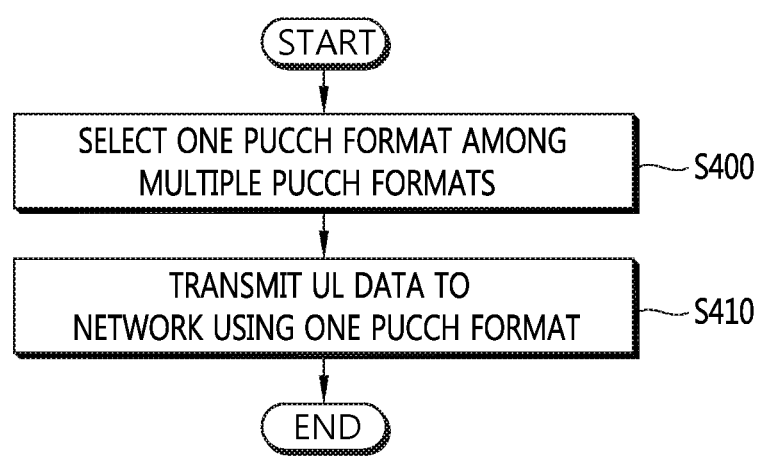
FIG. 10 shows a method for transmitting, by a UE, UL data according to another embodiment of the present invention.

FIG. 10 shows a method for transmitting, by a UE, UL data according to another embodiment of the present invention. The UE may be one of a UE requiring coverage enhancements, a MTC UE, a low cost UE, a low end UE, a low complexity UE, a narrow band UE, a small band UE, or a new category UE. Even though not described in the embodiment of FIG. 10, various descriptions for utilizing PUCCH format according to an embodiment of the present invention described above may be applied to the embodiment of FIG. 10.

In step S400, the UE selects one PUCCH format among multiple PUCCH formats. The one PUCCH format may determine a number of subframes need to transmit one TB. The one PUCCH format may be pre-determined or configured semi-statically by the network. The one PUCCH format may be one of PUCCH format 3 or PUCCH format 2. Further, the UE may receive a UL grant which determines a TBS and allocates UL resources.

In step S410, the UE transmits the UL data to a network by using the one PUCCH format. The UE may divide one TB for the UL data into a plurality of segments. Each segment may be carried by the one PUCCH format in one subframe. Or, the one TB for the UL data may be encoded via turbo coding.

(3) New UL channel format may be utilized according to an embodiment of the present invention. Currently, PUCCH and PUSCH formats are available to transmit control information and/or data in UL. For MTC UE, particularly in coverage limiting scenarios, a new channel format customized for coverage limiting scenarios may be considered. One example is to use only one tone (i.e. subcarrier) for any UL transmission. For example, if single tone physical random access channel (PRACH) format is available where different codes may be used to allow code division multiplexing (CDM) among multiple UEs, code may be selected to represent ACK or NACK. More generally, RACH resource may be used (which can be configured separately from RACH configuration) to transmit ACK or NACK. More specifically, only ACK may be transmitted if single tone RACH with a certain set of code are used to transmit ACK. For PUSCH transmission, similar mechanism with data transmission may be considered where one bit or K bits are grouped and transmitted via one RACH (used for UCI transmission) transmission and multiple RACHs may be used to carry one TB. Similar to mechanisms partitioning one TB carried over multiple PUCCH, direct partitioning of TB or coded bits may also be considered.

However, given that MTC UE in coverage limiting scenarios may require coverage enhancement mode only depending on deployment scenarios, from the hardware implementation perspective, the UE may have to also implement low complexity aspects. In that sense, it is likely that MTC UE may have to implement both PUCCH and PUSCH formats to support UL transmission. Thus, a new UL channel format may add complexity if it is totally different from PUCCH and/or PUSCH. To minimize the impact of a new UL channel format, one approach may to use demodulation reference signal (DM-RS) transmission from PUCCH and data encoding/mapping from PUSCH. If this approach is used, the sequence and generation of DM-RS may follow RS generation per PUCCH format (including cyclic shift (CS) and other variables). For each parameter used for generating DM-RS sequence for PUCCH, the following two approaches may be considered.

All parameters, which are used in the conventional PUCCH transmission, may be used. For example, if two DM-RS symbols are needed per slot, PUCCH format 2 or 3 DM-RS may be used. If three DM-RS symbols are needed per slot, PUCCH format 1 or 1a may be used. Even though DL transmission uses normal CP to allow potential multiplexing with legacy UEs, in coverage enhancement, extended CP for UL transmission may be used. In this case, from the DM-RS generation perspective, either PUCCH format 1/1a or 2/3 may be used. This means that DM-RS sequence generation and mapping of DM-RS may follow each PUCCH format being used. However, slot hopping in data transmission may not be used. Thus, in this case, mapping of DM-RS needs to be adjusted not to apply slot hopping. Group hopping/sequence hopping used for DM-RS sequence generation may follow configuration for PUCCH if this approach is used. The motivation of this approach is to utilize the same hardware implementation/sequence generation from the DM-RS generation perspective. In this case, resource assigned to PUCCH may be also used instead of resource allocation by DCI. In this case, RA field in UL grant may be used for acknowledgement resource indicator (ARI) to determine PUCCH resource among the configured potential PUCCH resources. Alternatively, the resource allocation may follow UL grant regardless of UL transmission format.

All parameters, which are used in the conventional PUSCH transmission, may be used. Even though sequence of DM-RS is generated based on PUCCH format, parameters may follow configuration for PUSCH transmission. In this case, some mapping between parameters may be needed. In this case, for example group hopping and sequence hopping configuration may follow configurations for PUSCH, instead of PUCCH.

Utilizing a new UL channel format may be triggered by one of the following approaches.

Indicate via DCI: For example, for coverage enhancement mode, cyclic shift in UL grant may be used to indicate whether a new UL channel format is used or not. For example, one or a few CS states may be reserved to indicate whether a new UL channel format is used or not (e.g. CS='111' may indicate that the new UL channel format is used). By this approach, those reserved states cannot be used for PUSCH. Another approach may be to use a new UL channel format only if the allocated resource is 1 RB.

Semi-static configuration per coverage enhancement level or repetition level: Since a UE may also support low complexity aspect without coverage enhancement where legacy PUCCH and/or PUSCH is used for UL transmission, the UE may also support legacy UL channel formats. Thus, it may be considered to use a new UL channel format only if the required coverage enhancement level becomes larger than a value (e.g. 5 dB). The threshold may be also configured by higher layer. If there is no threshold configured or the threshold is the maximum coverage level that the network supports, it may imply that a new UL channel format is not used, and legacy PUCCH/PUSCH formats are used for all UL transmissions.

Pre-fixed per coverage enhancement level or repetition level: Similar to the second approach, the use of new UL channel format may be determined by coverage enhancement level where the threshold may be pre-fixed.

Semi-static configuration: In general, the use of new UL channel format may be higher layer configured where the conditions which trigger the use of new UL channel format may be also configured by higher layer as well.

When new UL channel format is used, ACK/NACK and/or CSI piggyback may be disabled. If it is enabled, new mapping of UCI piggyback may be used around DM-RS following a new DM-RS pattern. Further, for data, modulation and coding may be based on turbo coding with MCS indicated by the UL grant (or MCS semi-statically configured or pre-fixed).

Figure 11:
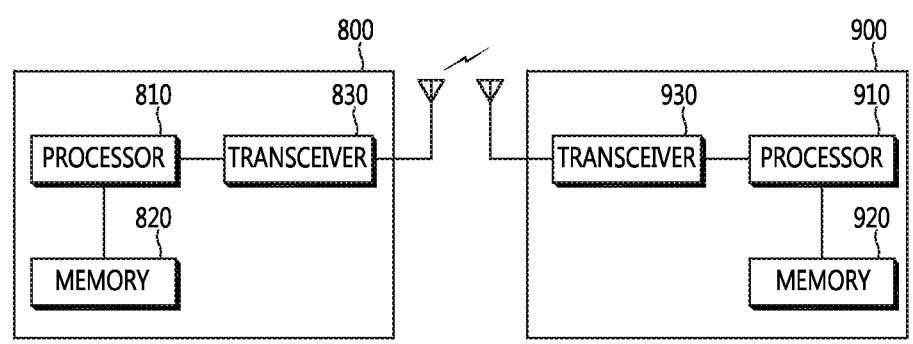
FIG. 11 shows a wireless communication system to implement an embodiment of the present invention.

FIG. 11 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a machine-type communication (MTC) user equipment (UE), uplink (UL) data in a wireless communication system, the method comprising:
receiving a threshold value for triggering a new UL channel format, from a network;
determining a coverage enhancement (CE) level,
wherein the CE level of the MTC UE is higher than the threshold value;
transmitting the UL data to the network based on the new UL channel format,
wherein the new UL channel format is used by the MTC UE to transmit the UL data in a CE mode, and
wherein, in the new UL channel format, a demodulation reference signal (DM-RS) is used from a physical uplink control channel (PUCCH) and data encoding and mapping are used from a physical uplink shared channel (PUSCH).

2. The method of claim 1, wherein the threshold value is configured by a higher layer.

3. The method of claim 1, wherein the threshold value is fixed.

4. The method of claim 1, further comprising:
receiving downlink control information (DCI) including a cyclic shift for triggering the new UL channel format.

5. The method of claim 4, wherein a resource allocation of 1resource block (RB) in the DCI informs the MTC UE about the new UL channel format.

6. A machine-type communication (MTC) user equipment (UE) in a wireless communication system, the MTC UE comprising:
a memory;
a transceiver; and
a processor, operatively coupled to the memory and the transceiver, configured to:
control the transceiver to receive a threshold value for triggering a new UL channel format, from a network;
determine a coverage enhancement (CE) level, wherein the CE level of the MTC UE is higher than the threshold value;
control the transceiver to transmit UL data to the network based on the new UL channel format,
wherein the new UL channel format is used by the MTC UE to transmit the UL data in a CE mode, and
wherein, in the new UL channel format, a demodulation reference signal (DM-RS) is used from a physical uplink control channel (PUCCH) and data encoding and mapping are used from a physical uplink shared channel (PUSCH).

7. The MTC UE of claim 6, wherein the threshold value is configured by a higher layer.

8. The MTC UE of claim 6, wherein the threshold value is fixed.

9. The MTC UE of claim 6, wherein the processor controls the transceiver to receive downlink control information (DCI) including a cyclic shift for triggering the new UL channel format.

10. The MTC UE of claim 9, wherein a resource allocation of 1resource block (RB) in the DCI informs the MTC UE about the new UL channel format.

* * * * *